(12) United States Patent
Clinton et al.

(10) Patent No.: US 7,593,184 B2
(45) Date of Patent: Sep. 22, 2009

(54) ROTATING WRITE FIELD GENERATED BY CIRCULATING DOMAIN WALLS IN A MAGNETIC RING: A DC-DRIVEN HIGH-FREQUENCY OSCILLATOR

(75) Inventors: Thomas William Clinton, Pittsburgh, PA (US); Werner Scholz, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 596 days.

(21) Appl. No.: 11/257,187

(22) Filed: Oct. 24, 2005

(65) Prior Publication Data

US 2007/0090903 A1    Apr. 26, 2007

(51) Int. Cl.
*G11B 5/127* (2006.01)

(52) U.S. Cl. ............................................. 360/125.01
(58) Field of Classification Search ............. 360/125.01
See application file for complete search history.

(56) References Cited

U.S. PATENT DOCUMENTS

| | | | | |
|---|---|---|---|---|
| 3,686,468 | A * | 8/1972 | Garnier, Jr. ............. | 360/125.01 |
| 5,541,868 | A * | 7/1996 | Prinz ........................... | 365/98 |
| 5,717,630 | A * | 2/1998 | Koshikawa et al. ......... | 365/151 |
| 6,377,149 | B1 * | 4/2002 | Miyata ....................... | 335/306 |
| 6,391,483 | B1 * | 5/2002 | Zhu et al. ................... | 428/810 |
| 6,452,383 | B1 * | 9/2002 | Goedecke ............... | 324/207.22 |
| 6,665,136 | B2 | 12/2003 | Clinton et al. | |
| 6,674,662 | B1 | 1/2004 | Hillebrands et al. | |
| 6,700,720 | B1 | 3/2004 | Allenspach et al. | |
| 6,906,369 | B2 * | 6/2005 | Ross et al. ................... | 257/295 |
| 6,987,282 | B2 * | 1/2006 | Amin et al. .................... | 257/34 |
| 7,002,839 | B2 * | 2/2006 | Kawabata et al. ........... | 365/171 |
| 7,020,015 | B1 * | 3/2006 | Hong et al. .................. | 365/171 |
| 7,307,876 | B2 * | 12/2007 | Kent et al. ................... | 365/171 |
| 2003/0141774 | A1 * | 7/2003 | Komura et al. ......... | 310/156.43 |
| 2003/0227701 | A1 | 12/2003 | Clinton et al. | |
| 2004/0211996 | A1 * | 10/2004 | Ross et al. ................... | 257/295 |
| 2005/0128842 | A1 * | 6/2005 | Wei ............................. | 365/205 |

OTHER PUBLICATIONS

J. A. Katine et al., "Current-Driven Magnetization Reversal and Spin-Wave Excitations in Co/Cu/Co Pillars," *Physical Review Letters*, vol. 84, No. 14, Apr. 3, 2000, pp. 3149-3152.

H. Forster et al., "Micromagnetic Simulation of Domain Wall Motion in Magnetic Nano-Wires," *Journal of Magnetism and Magnetic Materials*, vol. 249, 2002, pp. 181-186.

S. Kaka et al., "Precessional Switching of Submicrometer Spin Valves," *Applied Physics Letters*, vol. 80, No. 16, Apr. 22, 2002, pp. 2958-2960.

M. Kläui et al., "Vortex Formation in Narrow Ferromagnetic Rings," *Journal of Physics: Condensed Matter*, vol. 15, 2003, pp. R985-R1023.

M. Kläui et al., "Controlled and Reproducible Domain Wall Displacement by Current Pulses Injected Into Ferromagnetic Ring Structures," *Physical Review Letters*, 2005, pp. 1- 4.

* cited by examiner

*Primary Examiner*—Brian E Miller
(74) *Attorney, Agent, or Firm*—Robert P. Lenart, Esq.; Pietragallo Gordon Alfano Bosick & Raspanti, LLP (57) ABSTRACT

An apparatus comprises a ring of magnetic material, a source for applying a setting magnetic field to the ring, and first and second electrodes for applying an electric current to the ring. A method of using the apparatus to write to a magnetic storage medium is also provided.

10 Claims, 10 Drawing Sheets

ROTATING WRITE FIELD GENERATED BY CIRCULATING DOMAIN WALLS IN A MAGNETIC RING: A DC-DRIVEN HIGH-FREQUENCY OSCILLATOR

FIELD OF THE INVENTION

This invention relates to magnetic recording apparatus and more particularly to apparatus and methods for generating a magnetic field for writing data to a magnetic storage medium.

BACKGROUND OF THE INVENTION

As bit-areal densities in magnetic recording continue to progress in an effort to increase the storage capacity of hard disc drives, magnetic transition (bit) dimensions and, concomitantly, recording head critical features are being pushed below 100 nm. In a parallel effort, to make the recording medium stable at higher areal densities, magnetically harder (high coercivity) medium materials are required. Traditionally, writing to a harder medium has been achieved by increasing the saturation magnetization, or $4\pi M_s$ value, of the magnetic material comprising the inductive write head, thus bolstering the magnetic field applied to the medium. Though there has been some success in materials research efforts to increase $M_s$ of the write head, the rate of increase is not significant enough to sustain the annual growth rate of bit-areal densities in disc storage. Further, continued increases in $M_s$ are likely unsustainable as the materials reach their fundamental limits. A consequence of higher areal densities is an increase in data rates. Data rates are advancing toward a GHz and beyond, where it becomes increasingly difficult to switch the magnetization of the recording medium using a conventional write field applied anti-parallel to the magnetization direction. Thus, there is a need for a writing process capable of switching higher coercivity media at increasingly high data rates.

SUMMARY OF THE INVENTION

The invention provides an apparatus comprising a ring of magnetic material, a source for applying a setting magnetic field to the ring, and first and second electrodes for applying an electric current to the ring.

In another aspect, the invention provides a method comprising: establishing an onion magnetization state in a ring of magnetic material, passing an electric current through the ring to produce a precessing magnetic field, and using the precessing magnetic field to switch directions of magnetization of domains in a recording medium.

The invention further encompasses an apparatus comprising a magnetic recording medium, a ring of magnetic material, a source for applying a setting magnetic field to the ring, and first and second electrodes for applying an electric current to the ring to create a precessing magnetic field for switching directions of magnetization of domains in the recording medium.

DETAILED DESCRIPTION OF THE INVENTION

Figure 1:
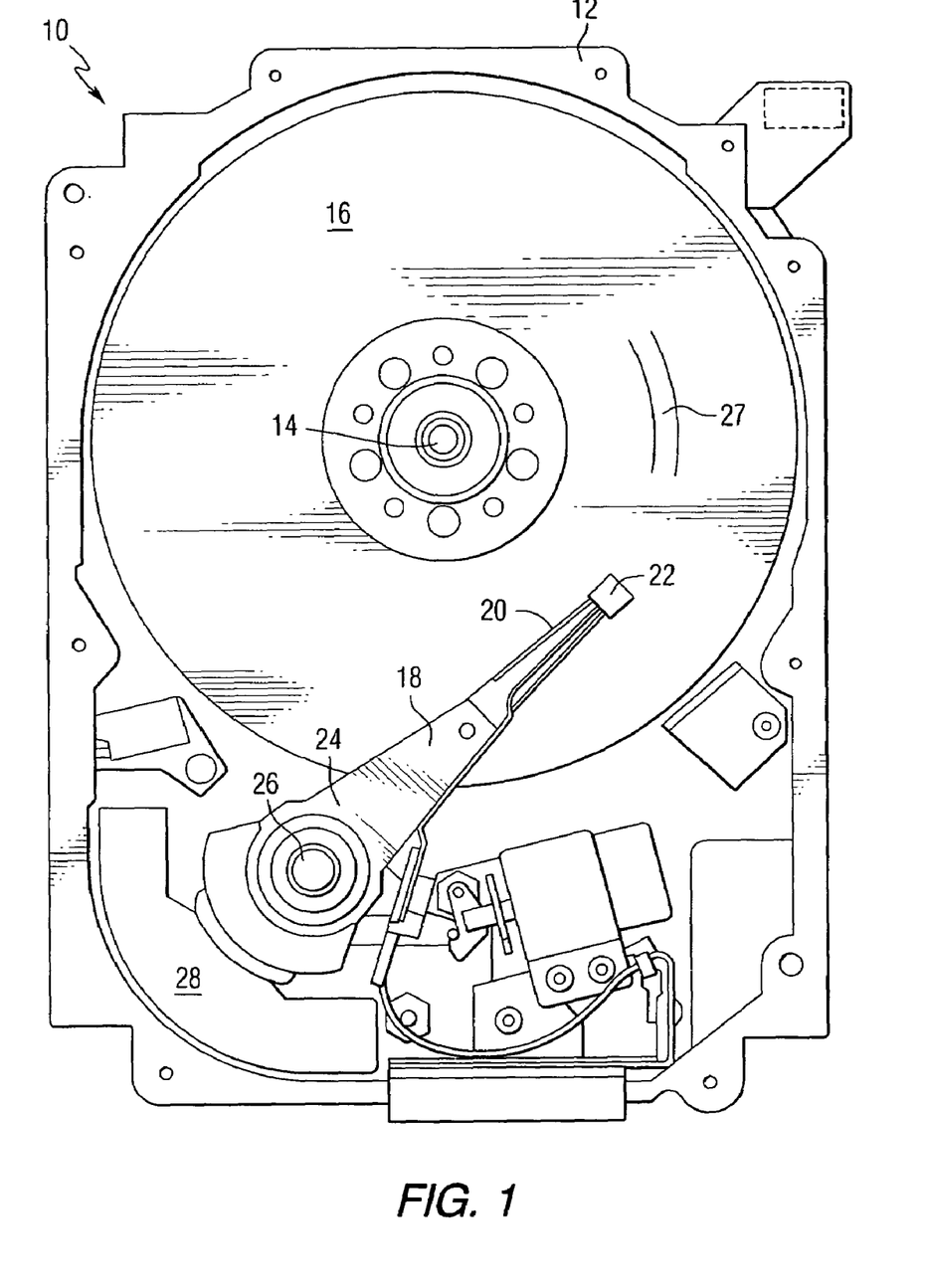
FIG. 1 is a pictorial representation of the mechanical portion of a disc drive that can be constructed in accordance with the invention.

FIG. 1 is a pictorial representation of a disc drive 10 that can utilize a recording head in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium, such as a magnetic recording medium 16, which may be a perpendicular, longitudinal and/or tilted magnetic recording medium, within the housing 12. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art.

The recording head produces a magnetic field that is used to write data to the magnetic storage medium. This invention includes the use of a ring of magnetic material in the recording head to generate a rotating magnetic field that is used to precessionally switch the magnetization of a storage medium at very high data rates and with relatively modest field magnitudes.

A ring of magnetic material saturated with an in-plane field can have a remanent magnetization, known as the "onion" state, such that there is a net in-plane field in the core of the ring that points along the direction of the original applied field. The field lines in the core begin and end on two domain walls on opposite sides of the ring. A DC current circulating around the magnetic ring applies a pressure to the domain walls due to angular momentum transfer from the spin-polarized electron flow. The domain walls move in the same direction as the electron flow, which is actually opposite to the current direction. The pressure drives the two domains around the ring with the same sense, still at opposite sides, such that the vector field in the core rotates like a spinning needle of a compass. Thus, a DC current can be used to generate a continuously rotating in-plane field, or, alternatively, an AC current can be used to alternate the rotational speed and direction. Additionally, the circulating currents generate a perpendicular field threading the core of the ring that is collocated with the rotary field. A write field with these characteristics has the potential to precessionally switch the magnetization of a storage medium at very high data rates and with relatively modest field magnitudes.

Figure 2:
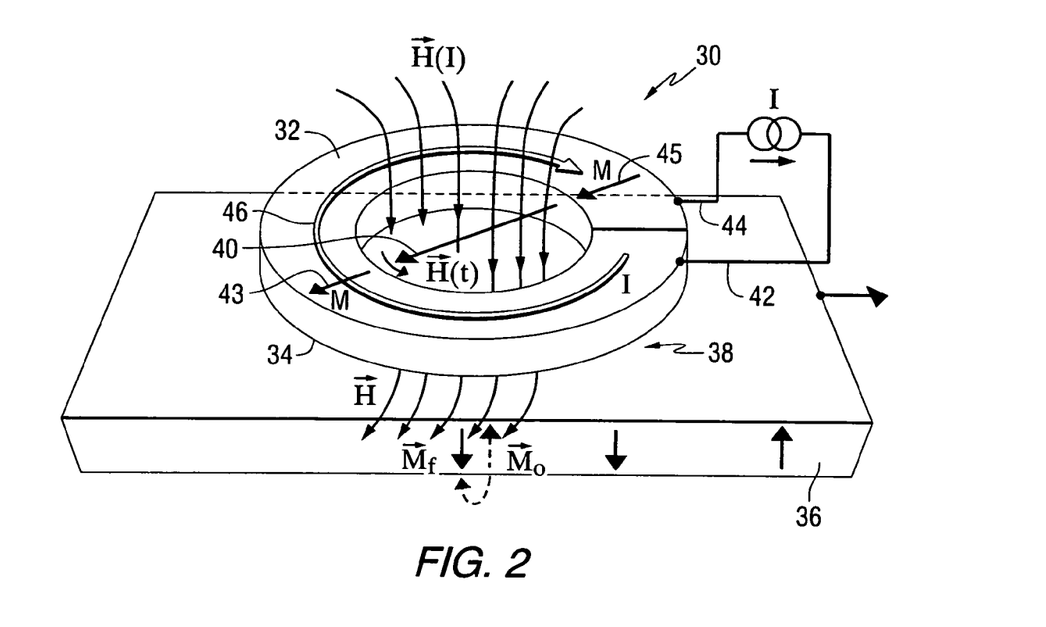
FIG. 2 is a schematic representation of a portion of a magnetic write head constructed in accordance with the invention.

FIG. 2 is a schematic representation of a portion of a recording head 30 that includes a ring of magnetic material 32 positioned adjacent to an air bearing surface 34 of the recording head. The recording head is shown to be positioned adjacent to a magnetic recording medium 36 and separated from the medium by an air bearing 38. A magnetic field pulse is applied to the ring of magnetic material and establishes a remanent magnetization in the ring illustrated by arrow M. The magnetic field can be applied, for example, by passing an electrical current through a wire (not shown in this view) positioned adjacent to the ring. Electrodes 42 and 44 are connected to the ring. After the magnetization of the ring is set, the current through the wire would be turned off and a current 46 is supplied to the ring through electrodes 42 and 44 to cause magnetic domains 43 and 45 to move around the ring, resulting in the in-plane rotation of magnetic field 40, H(t). Current 46 also generates a self magnetic field H(I) that threads the ring. The net magnetic field, H, itself precesses, and acts on the magnetization, $M_o$, in the underlying medium to precessionally switch it to its final state, $M_f$.

The writer 30 shown in FIG. 2 can deliver a magnetic field to the recording medium 36, to switch the direction of magnetization of magnetic domains in the medium. Although the writer geometry of FIG. 2 is specific to a perpendicular medium, the medium can be, for example, a longitudinal medium having an easy axis of magnetization parallel to a plane of the medium, a perpendicular medium having an easy axis of magnetization perpendicular to a plane of the medium, a tilted medium, or a patterned medium.

The magnetic field is selectively applied for a period of time sufficient to switch the magnetization of the magnetic recording medium from its initial magnetization direction to a final magnetization direction substantially anti-parallel to the initial magnetization direction. Typically, the initial and final magnetization directions will be along an easy axis of magnetization of the magnetic recording medium.

A simple model to describe the dynamics of a single-domain magnetization $\vec{M}$ in the presence of a magnetic field $\vec{H}$ is expressed by the Landau-Lifshitz equation, $$\frac{d\vec{M}}{dt} = -\mu_o \gamma \vec{M} \times \vec{H} - \alpha \left( \frac{\mu_o \gamma}{|\vec{M}|} \right) \vec{M} \times (\vec{M} \times \vec{H}), \quad (1)$$

where $\gamma$ is the gyromagnetic ratio, $\mu_o$ is the magnetic permeability of free space, and $\alpha$ is the damping parameter. The first term describes precessional motion of the magnetization $\vec{M}$ about the field $\vec{H}$, while the second term represents damping of the motion and ultimately will force $\vec{M}$ to relax along $\vec{H}$. On the timescales of a conventional write process, the switching is best described by the full expression in Eq. (1), as damping plays a significant role in the dynamics of the magnetization of the storage medium, where $\vec{M}$ ultimately relaxes along the effective direction of the write field, $\vec{M} \| \vec{H}_{write}$, parallel to the easy axis of the storage medium. However, for timescales short enough, the precessional term describes most of the dynamics, as there is no time for significant damping to occur. Additionally, a writing process using a transverse field has the benefit of applying the field with maximum torque, T, applied to the magnetization, where $T = |\vec{M}\|\vec{H}|\sin\theta (= |\vec{M} \times \vec{H}|)$, and $\theta$ is the angle between M and H.

Figure 3:
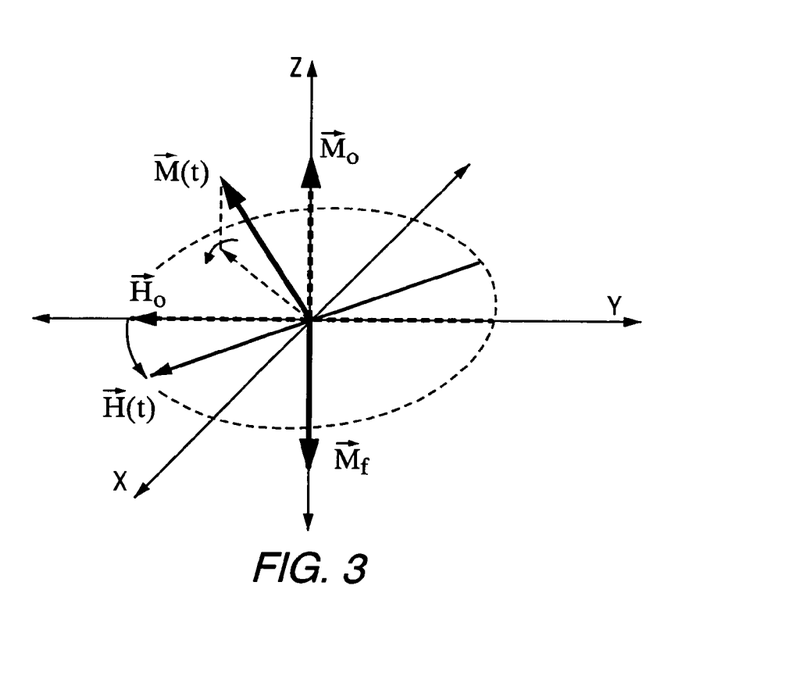
FIG. 3 is a schematic diagram that depicts the precessional switching process.

The precessional switching process is schematically depicted in FIG. 3, where the time varying magnetic field $\vec{H}(t)$ is perpendicular to the precessing magnetization $\vec{M}(t)$. The magnetization is in an initial state $\vec{M}_o$ along the magnetic easy axis (the z-axis in this example) and a field $\vec{H}(t)$ is turned on in the x-y plane perpendicular to the magnetization. The initial directions of the applied field, $\vec{H}_o$, and the anisotropy field $\vec{H}_k$ (parallel to the easy axis) dictate the trajectory of the precessing magnetization according to the first term in Eq. (1), and as depicted in FIG. 3. However, if H is small compared to $H_k$, then the direction of rotation (clockwise or counterclockwise) of the precession is dictated by $\vec{H}_k$.

Since the magnetization is initially up in this example, then Eq. (1) dictates that $\vec{M}$ precesses with a counterclockwise rotational sense about the z-axis (about $H_k$), as shown in the figure. If the applied field, $\vec{H}(t)$, has the same rotational direction and frequency (i.e. the applied field and M are in resonance), remaining orthogonal to the precessing magnetization until it is reversed, then the magnetization can be switched with minimal energy and applied field magnitude. If $\vec{H}(t)$ is out of phase with the precession of $\vec{M}$ (has the wrong rotational sense or frequency), then the magnetization will not be reversed. For example, if the initial magnetization was down (then $\vec{H}_k$ is also down and the magnetization will precess clockwise), then the applied field, $\vec{H}(t)$, as described above, would not reverse it, and it would remain down.

In terms of a writing process, to write a down magnetization, $\vec{H}(t)$ should, at least initially, rotate counterclockwise, as this can reverse an up magnetization or will leave a down magnetization unchanged. To write an up magnetization, $\vec{H}(t)$ should, at least initially, rotate clockwise, as this can reverse a down magnetization, or will leave an up magnetization unchanged. An additional perpendicular field, or set field, applied parallel to the final magnetization $\vec{M}_f$ direction can aid the magnetization switching by decreasing the time for reversal, as well as decreasing the magnitude of the required in-plane magnetic field.

Figure 4A:
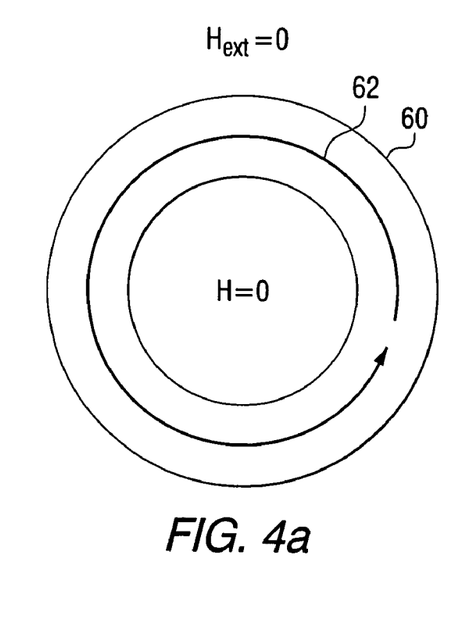
FIGS. 4a, 4b and 4c are top views of a magnetic ring geometry that can be used in the invention.
Figure 4B:
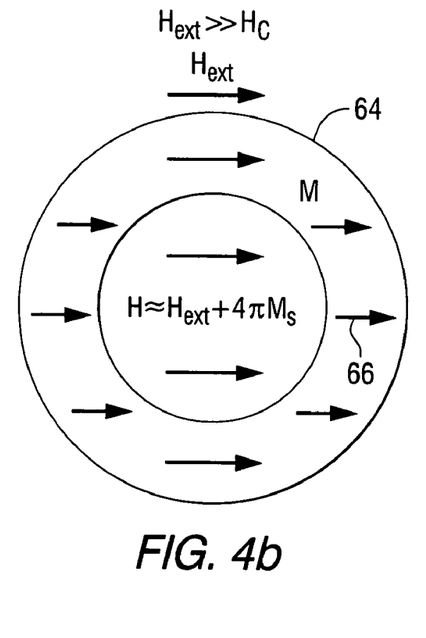
Figure 4C:
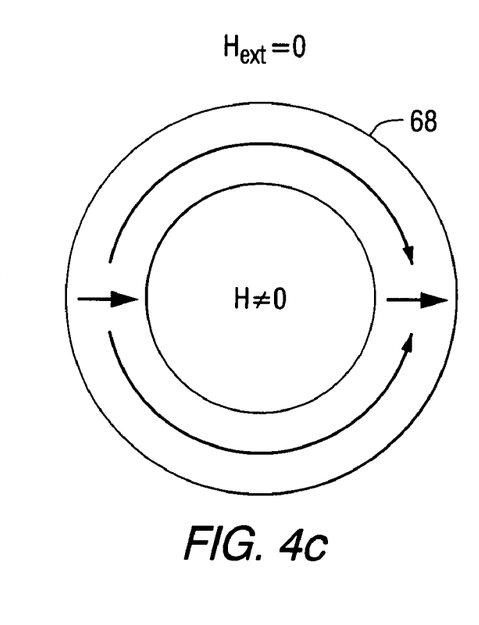

FIGS. 4a, 4b and 4c show a magnetic ring geometry that can be used in the invention. The magnetic properties of magnetic rings have been studied in great detail by others both experimentally and theoretically down to sub-100 nm dimensions. FIGS. 4a, 4b and 4c show three phases of a ring that depend on its magnetic history. These three phases play a particularly important role in the writing concept of this invention, and will be discussed in that context below. In FIG. 4a, ring 60 has a vortex magnetization 62, which is a highly stable state with no net magnetization and no remanent field, that is an initial vortex state, M=0. This would represent the quiescent state of the writer. In FIG. 4b, ring 64 has an external field $H_{ext}$ applied in the plane of the ring so that the magnetization M is saturated along the applied field direction illustrated by arrow 66, that is $M=M_s$. When the writer is first energized (from its quiescent vortex state), this represents the initial magnetization state to begin the writing sequence.

After saturating the magnetization and then turning off the external field, the ring can persist in what is known as the onion state, as depicted in ring 68 of FIG. 4c, where M≠0. The onion state has a net magnetization and a net magnetic field, in particular, in the core of the ring, where the field is largely parallel to the original applied field direction. The ring can be made of, for example, alloys of NiFe, CoFe, or other high moment materials known in the field.

Figure 5A:
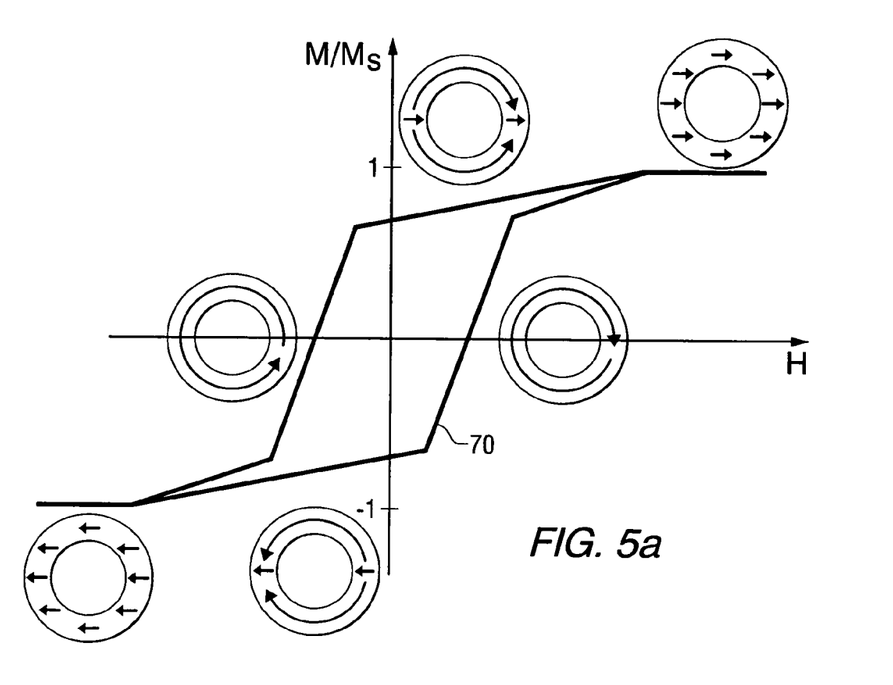
FIG. 5a is a schematic diagram of a full hysteresis loop for a magnetic ring.
Figure 5B:
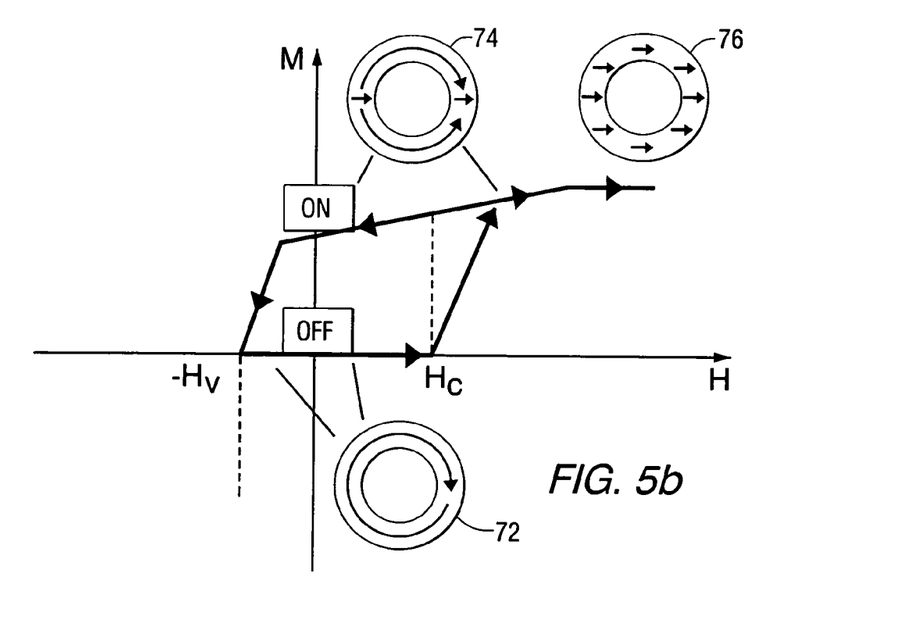
FIG. 5b is a schematic diagram of a partial hysteresis loop for a magnetic ring.

FIG. 5a is a schematic diagram of a full hysteresis loop 70 for a magnetic ring where the approximate magnetization orientation is depicted at points that are particularly relevant points to the invention, along the loop. The partial loop of FIG. 5b shows how an applied magnetic field can be cycled to access magnetization states relevant to the invention, in the non-hysteretic vortex regime (where M,dM/dH≈0), including the vortex (quiescent or Off) state 72; the saturated (initial On) state 76; and the onion (energized) state 74.

Figure 6:
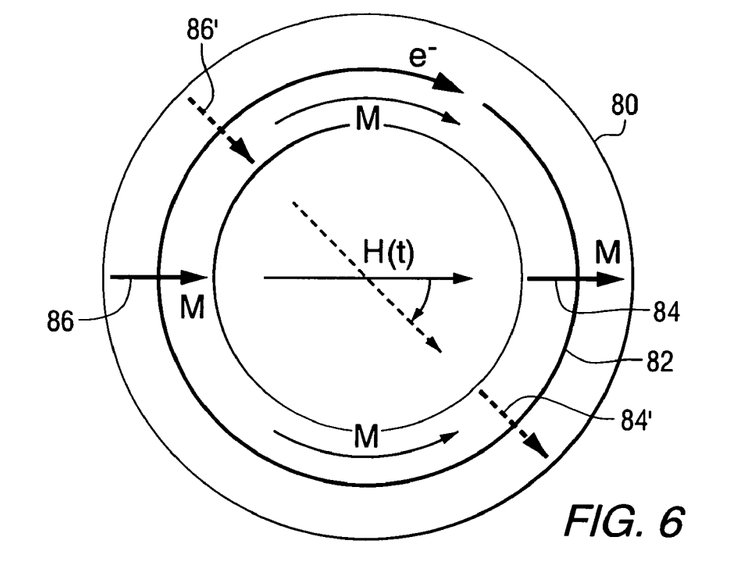
FIG. 6 schematically illustrates a technique for continuously rotating the magnetic field.

FIG. 6 schematically illustrates the technique for continuously rotating the magnetic field. The magnetic ring is a metal 80 that carries a spin-polarized current 82, as essentially all ferromagnetic metals are known to do. There are two domain walls 84 and 86 established in the onion state of the magnetic ring, where the walls are at opposite sides of the ring as shown in FIG. 6. If a circulating current is established in the ring, the spin-polarized electrons transfer angular momentum to the walls when passing through them, pushing the walls in the direction of electron flow and sweeping them around the perimeter of the ring, as depicted by item numbers 84' and 86'. If the ring is relatively uniform in geometry and material properties, the domains remain opposite each other such that the field in the core rotates uniformly about the axis of the ring.

Figure 7:
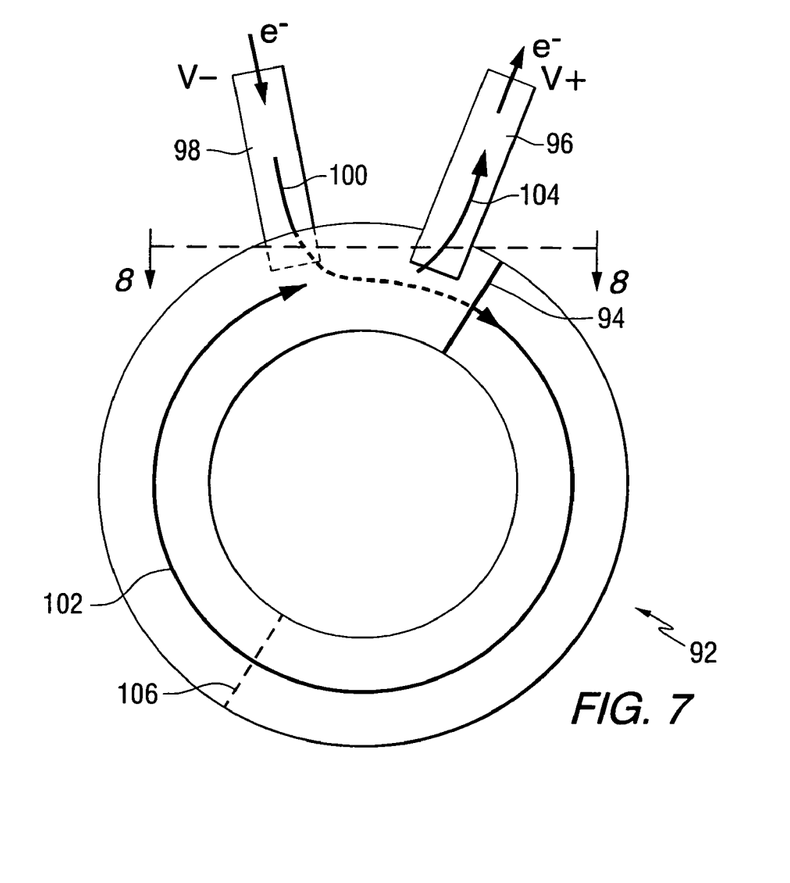
FIG. 7 is a top view of a magnetic ring.
Figure 8:
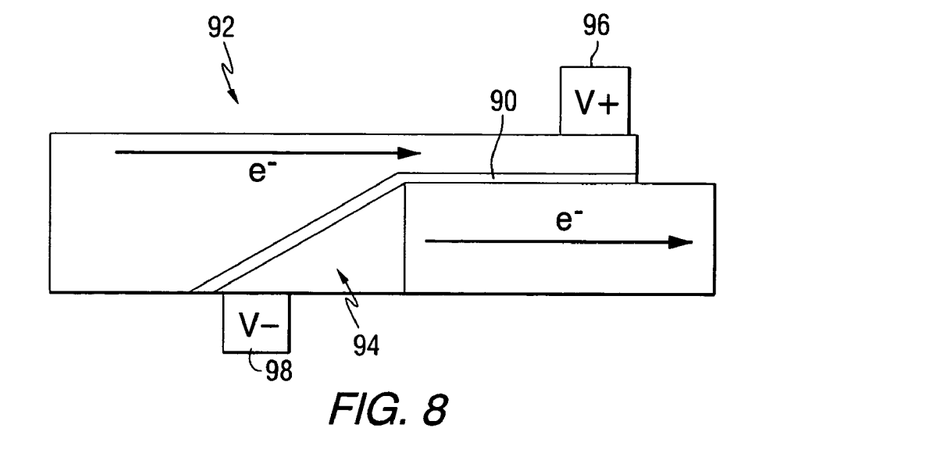
FIG. 8 is a sectional view of the ring of FIG. 7, taken along line 8-8.

One way to establish a circulating current is shown in FIGS. 7 and 8. A very thin layer of electrical insulation 90 is embedded in the ring 92, forming a ferromagnetic junction 94 that permits the flow of magnetic flux across the junction, but prevents the flow of electric current. Electrodes 96 and 98 are connected to the ring such that they are isolated electrically by the ferromagnetic junction. The insulator should be thin enough that there is a strong exchange coupling across the junction to preserve the magnetic properties of the ring material across it. It is also possible that a non-magnetic insulator could be used for the electrical isolation. As shown in FIG. 8, the ring winds around somewhat more than one turn i.e., the electrical distance between the two electrodes is greater than $2\pi R$, where R is the outer radius of the ring. In this way, the current can enter one electrode (through the bottom of the ring, in this example) and exit the other electrode (from the top of the ring, in this example) such that there is always a current flowing around the ring at every point around the circumference of the ring. In this way, there is at every point a pressure on a domain wall that keeps it rotating.

FIG. 8 shows a cross-sectional view of the ring and bottom and top electrodes of FIG. 7 taken along line 8-8, showing the electron flow illustrated by arrows 100, 102 and 104. The net current in the ring has a circulating flow that will apply the appropriate pressure to the domain wall. The dimensions of the top and bottom portion of that junction can be engineered to apply an increased current density that might be needed to prevent the domain wall from getting pinned or its motion impeded. A second junction 106 (referred to as a phase preserving junction) can be engineered at the opposite side of the ring to create a balanced pressure on both domain walls to preserve their desired phase difference of 180 degrees. The phase preserving junction can be made using an electrically conductive material with magnetic properties that preserve the phase of the domain walls.

Figure 9:
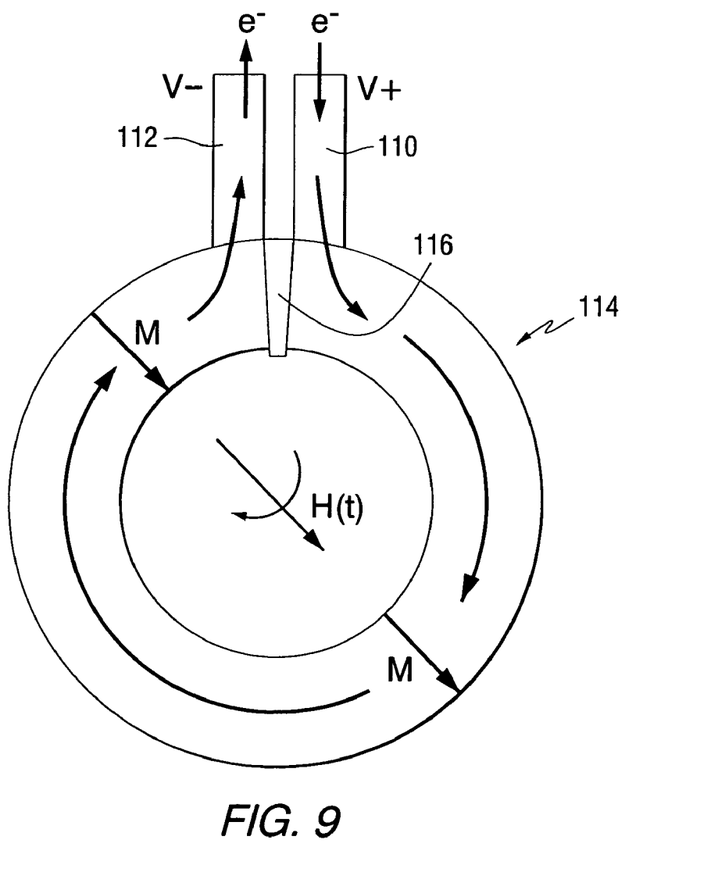
FIG. 9 is a top view of a magnetic ring.

A variation on the electrode placement described above is shown in FIG. 9, where the electrodes 110 and 112 are displaced by $2\pi R$, or less on the ring 114. Again, the electrodes are isolated from each other by an appropriate insulating material 116 that supports domain wall propagation. In this case, the current is not fully tangent to the circumference near the electrodes. However, it has been shown by others that the magnetization of a ring (in an onion state, for example) set in motion with an applied field pulse can continue to precess around the ring after the field is turned off. The analogy in the case of this invention is that the domain walls can continue to move through the ring even when the current through the wall vanishes for a period of time. Thus, the schematic drawing of FIG. 9 is one realization of this effect, and should have the advantage of lower fabrication complexity over that of FIGS. 7 and 8.

The spin momentum transfer effect has been demonstrated by others to apply a very strong effective force (or torque) on a magnetization, countering fields of more than a Tesla applied against the same magnetization. Thus, at an appropriately large current it should be possible to engineer a ring such that the pressure on the domain wall carries it over a junction, and other material and geometric imperfections, without slipping out of phase significantly.

Figure 10:
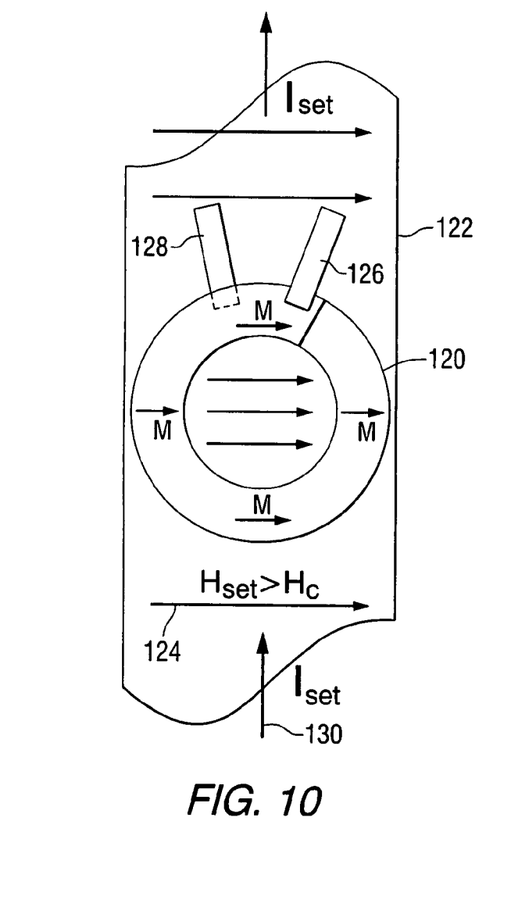
FIGS. 10 and 11 are plan views of a magnetic ring adjacent to a wire.
Figure 11:
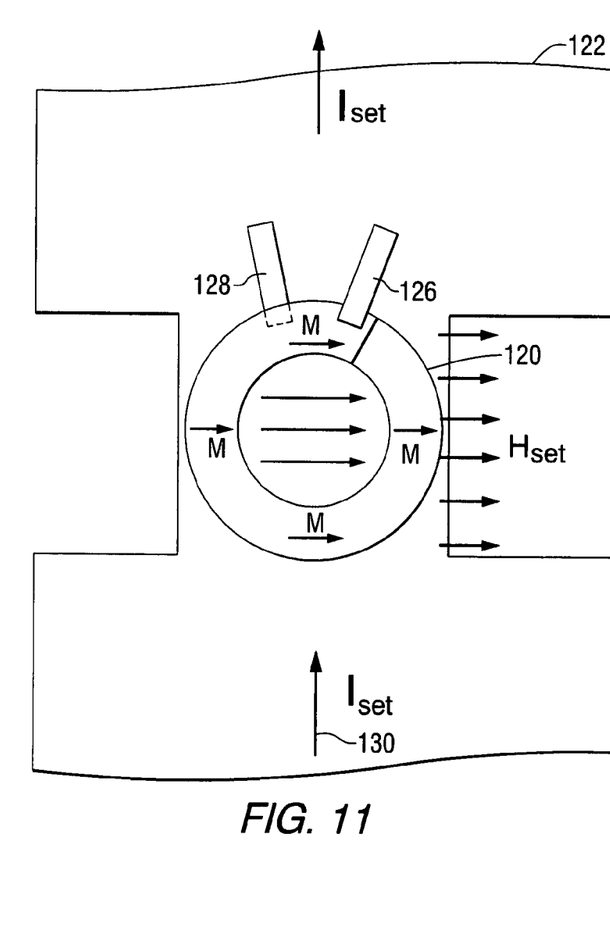

FIGS. 10 and 11 show the ring 120 integrated on top of a wire 122 that can be used to apply the external field $H_{set}$ 124 for setting the ring in the initial and final magnetization states described above. The ring and the electrodes 126 and 128 for injecting current to the ring are electrically isolated from the underlying wire. In particular, the ring can be saturated along the direction of the applied field, dictated by the polarity and magnitude of the current 130 through the wire. For a 100 nm diameter ring, as an example, an underlying wire may have a width of about 100 nm, and may have a comparable or smaller thickness. In this case, 20 mA of current through the wire would produce about 1000 Oe of in-plane field at the ring, which is generally enough field to saturate such a structure. The geometry of the wire should be such that the field from the wire is localized to the region of the ring so the wire does not unnecessarily disturb the media away from where the bit is being written. This can be done by constricting the wire dimensions near the ring, so the current density and flux density are large near the ring and small away from the ring, as shown in FIG. 11.

Figure 12A:
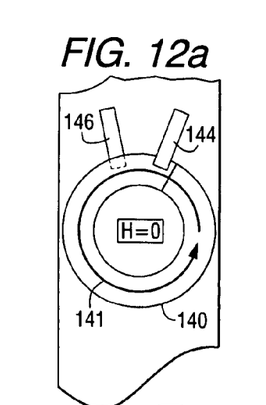
FIGS. 12a through 12i illustrate the switching of the magnetization of a magnetic ring.
Figure 12B:
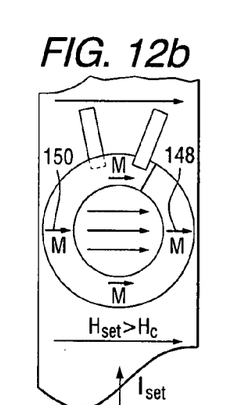
Figure 12C:
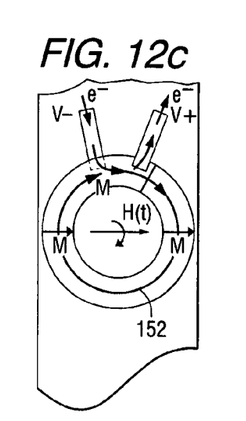
Figure 12D:
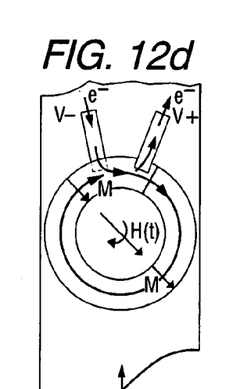
Figure 12E:
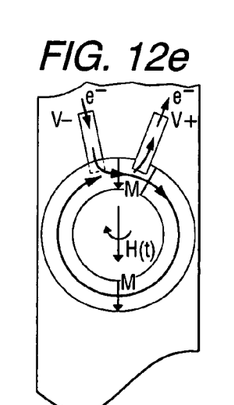
Figure 12F:
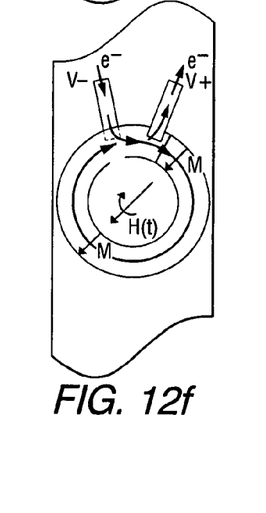
Figure 12G:
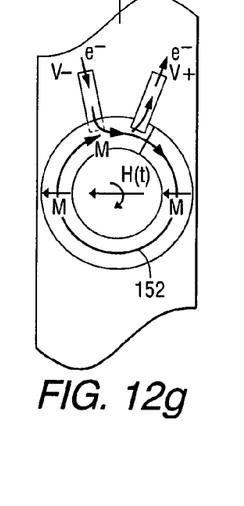
Figure 12H:
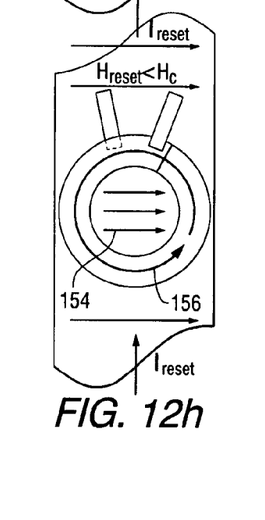
Figure 12I:
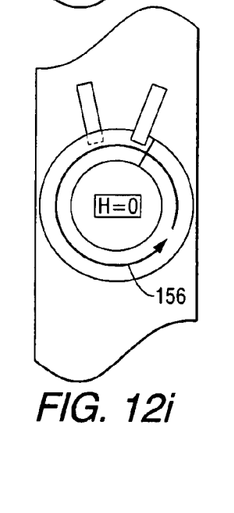

FIGS. 12a through 12i show a writing cycle starting from the upper left-hand side of FIG. 12a showing a ring 140 in the vortex (quiescent) state. Arrow 141 represents the vortex magnetization. The ring is positioned adjacent to a wire 142 that is used to produce a setting field. Electrodes 144 and 146 are connected to the ring to provide an electrical current. In FIG. 12b an initial current $I_{set}$ in the wire generates an $H_{set}$ magnetic field impulse that saturates the ring 140 and establishes domains 148 and 150. FIG. 12c shows that with the wire current off, a current (electron flow) 152 circulates through the ring that starts the rotation of the field H(t). FIGS. 12d through 12g show the field rotating over some appropriate period, after which, the current in the ring is turned off and an impulse field 154 is applied from the wire as shown in FIG. 12h. This impulse field re-establishes the vortex magnetization 156 in the ring, and returns the writer to its quiescent state as shown in FIG. 12i. While FIGS. 10, 11 and 12a through 12i show the use of a wire for applying the external magnetic field, it should be understood that other types of magnetic field sources could be used to provide the required external field.

Figure 13:
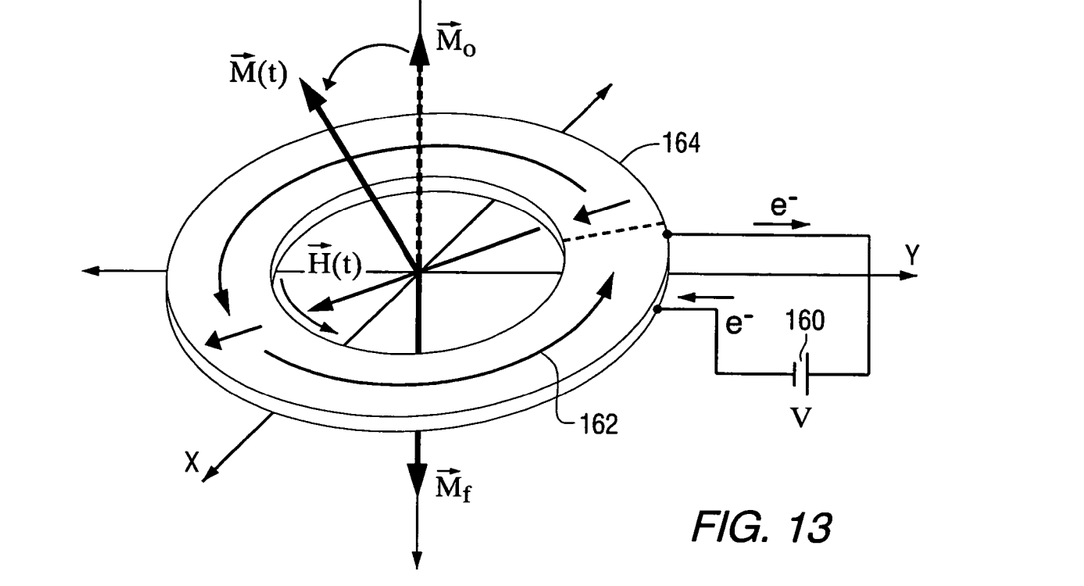
FIGS. 13, 14 and 15 illustrate the operation of a magnetic ring to produce a write field.

FIG. 13 is a 3D rendering of a precessional writing process using the writer of this invention. The precessional reversal of the media magnetization is similar to that described for FIG. 3, with the writer geometry incorporated as the source of the rotating write field. After the onion state has been set, a voltage source 160 supplies an electrical current 162 to the ring 164. The frequency of the rotating field needs to be more than a GHz to keep up with a precessing spin at or near the ferromagnetic resonance (FMR) frequency of the media, which is typically of the order of 10 GHz. The frequency, $f$, of the rotating field dictates a velocity of the domain circulating along the perimeter of the ring. As an example, we can estimate the required domain wall velocity, v, for a ring with an outer diameter of 50 nm (radius, r=25 nm):

$$v = \omega r = 2\pi f r \approx 2\pi(10 \text{ GHz})(25 \text{ nm}) = 2\pi(10^{10} \text{s}^{-1})(25 \times 10^{-9} \text{ m}) \approx 1500 \text{ m/s}. \quad (2)$$

Domain wall velocities of this order of magnitude are theoretically possible, but have not, to our knowledge, been experimentally demonstrated. The achievable velocity depends on the magnetic damping constant (the smaller the better) of the ring and the driving force generated by the current, for example. Of course, the required domain wall velocity will decrease for decreasing ring diameter according to Eq. (2).

Figure 14:
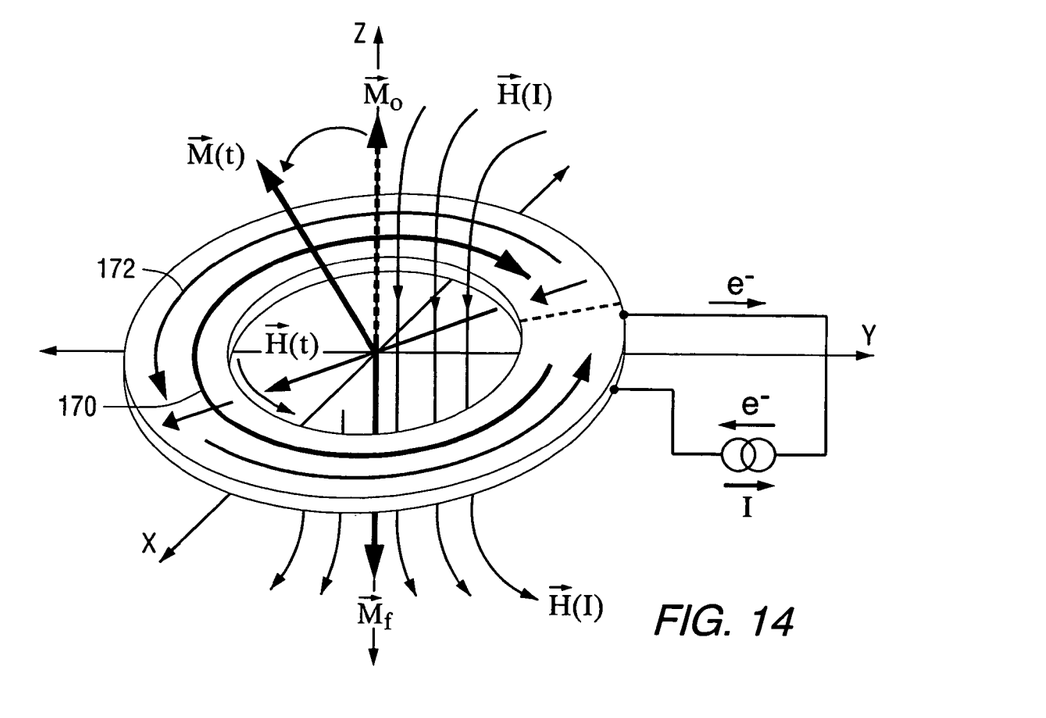

FIG. 14 is a schematic drawing depicting the conventional current flow 170 in the ring (opposite the sense of the electron flow 172) and the corresponding magnetic field generated by the current. In particular, the field from the current, H(I), threads the core of the ring, is collocated with the rotary field, and is parallel to the final magnetization direction. This perpendicular field aids in the reversal of the magnetization.

Figure 15:
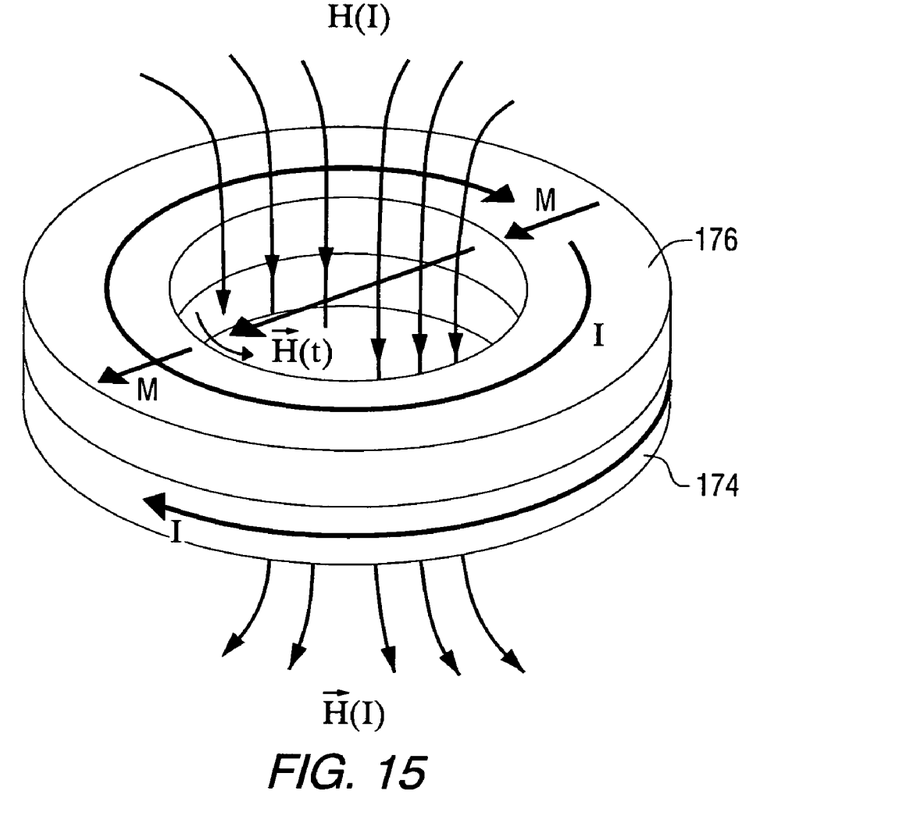

As shown in FIG. 15, a parallel non-magnetic conductor 174 can be integrated with the magnetic ring 176 as a way to engineer a specific perpendicular field strength independent of the desired driving current for the rotary field. The non-magnetic conductor forms a second ring that is positioned parallel to the plane of the magnetic ring. This might be the case if the current source being used is capable of delivering more current than is needed to drive the rotary field, and additional current can be shunted through the non-magnetic conductor to bolster the perpendicular field. The conductor can be a single layer or dual layers (positioned adjacent to the top and bottom of magnetic ring) or it can be part of a multi-layer ring including multiple repeats of bilayers of magnetic and non-magnetic conductive material.

Figure 16:
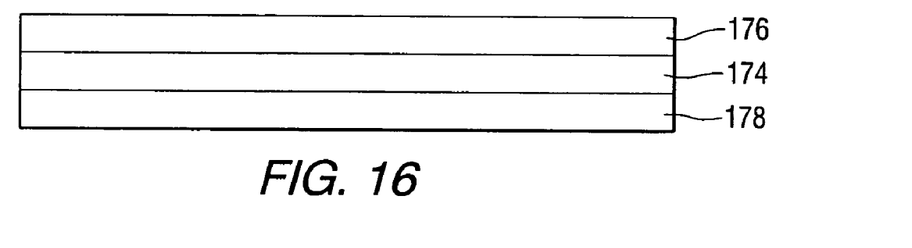
FIGS. 16 and 17 are side views of alternative magnetic ring structures.
Figure 17:
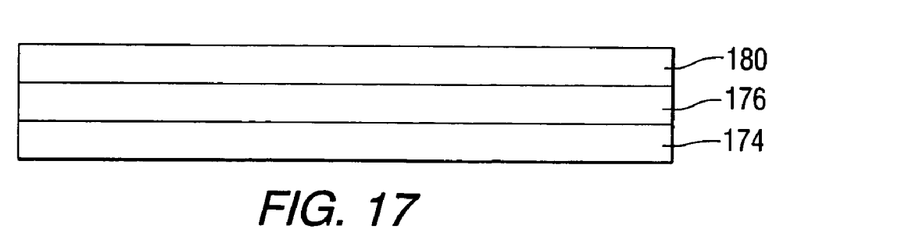

FIGS. 16 and 17 are side views of alternative ring structures. FIG. 16 shows a magnetic ring 176 with an adjacent ring 174 of electrically conductive, non-magnetic material and a second ring 178 of magnetic material adjacent to the non-magnetic ring. FIG. 17 shows a ring 176 of magnetic material positioned between two rings 174 and 180 of electrically conductive, non-magnetic material. FIGS. 16 and 17 show a multi-layer structure. Additional magnetic and non-magnetic rings can be added to these structures.

The geometry of a ring is most straightforwardly fabricated as a planar structure i.e., the ring is deposited in the plane of the wafer, which then translates to being the air bearing surface (ABS) of a recording head (where the ABS and wafer plane are parallel). However, it is possible that a fabrication technique could be developed to create the ring perpendicular to the plane of the wafer, such that the writer is fabricated in the more traditional way, where the ABS is perpendicular to the wafer plane. Also, the dimensions of the ring, such as thickness and inner and outer diameter, and the magnetic material dictate its magnetic properties and can be engineered for optimum performance. The effect of varying these parameters has been widely studied by others. Thus, the examples given herein are not meant to be all-inclusive, as there is a wide parameter space that can be taken advantage of to fabricate such devices that will depend on the specific application.

This invention uses a DC current to generate a continuously rotating in-plane field, or, alternatively, an AC current can be used to alternate the rotational speed and direction. A write field with these characteristics applied transverse to the media magnetization has the potential to precessionally switch the magnetization of a storage medium at very high data rates and with relatively modest field magnitudes. The transverse field applies the maximum torque to the medium magnetization, minimizing the energy required to write a transition, and the short timescale makes it possible to extend data rates well beyond present recording technology.

While the invention has been described in terms of several examples, it will be apparent to those skilled in the art that various changes can be made to the described examples without departing from the scope of the invention as set forth in the following claims.

What is claimed is:

1. An apparatus comprising:
   a ring of magnetic material;
   a source for applying a setting magnetic field to the ring, wherein the setting magnetic field is applied across the ring and in a direction in a plane of the ring; and
   first and second electrodes for applying an electric current to the ring.

2. The apparatus of claim 1, further comprising: a layer of electrically insulating material between first and second portions of the ring forming a first magnetic junction.

3. The apparatus of claim 2, wherein the first and second portions overlap each other adjacent to the magnetic junction.

4. The apparatus of claim 2, further comprising:
   a second magnetic junction positioned in the ring.

5. The apparatus of claim 1, wherein the source comprises:
   a wire positioned adjacent to the ring, wherein an electric current in the wire subjects the ring to the setting magnetic field of sufficient strength to saturate the ring.

6. The apparatus of claim 1, further comprising:
   a first ring of non-magnetic electrically conductive material positioned parallel to the ring of magnetic material.

7. The apparatus of claim 6, further comprising:
   a second ring of non-magnetic material positioned parallel to the ring of magnetic material and on the opposite side of the ring of magnetic material from the first ring of non-magnetic material.

8. The apparatus of claim 6, further comprising:
   a second ring of magnetic material positioned parallel to the first ring of non-magnetic material.

9. The apparatus of claim 1, wherein the ring comprises:
   a multilayer structure including magnetic and non-magnetic electrically conductive layers.

10. An apparatus comprising:
    a magnetic recording medium;
    a ring of magnetic material;
    a source for applying a setting magnetic field to the ring, wherein the setting magnetic field is applied across the ring and in a direction in a plane of the ring; and
    first and second electrodes for applying an electric current to the ring to create a precessing magnetic field for switching directions of magnetization of domains in the recording medium.

* * * * *

UNITED STATES PATENT AND TRADEMARK OFFICE
CERTIFICATE OF CORRECTION

| | | |
|---|---|---|
| PATENT NO. | : 7,593,184 B2 | Page 1 of 1 |
| APPLICATION NO. | : 11/257187 | |
| DATED | : September 22, 2009 | |
| INVENTOR(S) | : Clinton et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 926 days.

Signed and Sealed this

Twenty-first Day of September, 2010

David J. Kappos
*Director of the United States Patent and Trademark Office*